UNITED STATES PATENT OFFICE.

GEORGE HOLGATE, OF PHILADELPHIA, PENNSYLVANIA.

PROCESS OF PRESERVING ANIMAL MATTERS.

SPECIFICATION forming part of Letters Patent No. 326,035, dated September 3, 1885.

Application filed August 3, 1885. (No specimens.)

*To all whom it may concern:*

Be it known that I, GEORGE HOLGATE, a citizen of the United States, residing at Philadelphia, in the county of Philadelphia and State of Pennsylvania, have invented certain new and useful Improvements in Processes for the Preservation of Animal Matters, of which the following is a description.

My invention has reference to processes for the preservation of animal matters; and it consists, essentially, in treating animal matters— such as beef, pork, fish, game, eggs, &c.—with anhydrous sulphurous oxide after the animal heat has been extracted by refrigeration or otherwise, and, further, in the above steps combined with others, as fully set forth hereinafter.

Letters Patent No. 313,736 have been granted to me for the employment of anhydrous sulphurous-acid gas under certain conditions in the preservation of meats, &c. Therefore in this application I confine myself to the use of anhydrous sulphurous oxide, in the manner and for the purpose hereinafter specified, as distinguished from the use of the ordinary sulphurous acid. My process is applicable to the preservation of any kind of animal matters, but especially adapted to the treatment of hams.

In carrying out this process in the preservation of hams I proceed as follows: The green hams are first cooled or the animal heat is extracted, either by refrigeration or otherwise—as, for instance, subjecting them to the atmosphere when at a temperature from about 34° to 40° Fahrenheit—and after the animal heat has been extracted the hams are placed in a tank or chamber capable of being made air-tight, from which the air and moisture are extracted by mechanical means, thus leaving the hams in a cool and dry condition. The tank or chamber is then filled with anhydrous oxide, which is preferably admitted under pressure, thus causing the said gas to permeate every pore of the ham, which by the previous treatment has been brought to the very best possible condition to receive and become impregnated by this preserving-gas. If desired, carbonic-acid gas may also be admitted to the tank or chamber during or after the admittance of the anhydrous sulphurous oxide, in substantially the same manner as set forth in said previous patent of mine. The treated hams are next subjected to a mild pickle, as under these new conditions they are more readily affected by the pickle bath, thus saving much time and expense. After being pickled the hams are again placed in an air-tight tank or chamber, and the air and moisture are once more extracted, and the hams may be then smoked in the usual manner, though the smoke is preferably admitted to the exhausted tank or chamber under pressure, and thereby enabled to permeate the pickled hams in the most perfect and speedy manner.

In the preservation of meats—as beef, game, &c.—which are to be maintained in a fresh condition, the animal heat is first extracted, as above indicated, the meats, &c., are then placed in the air-tight tank or chamber, the air and moisture are extracted from tank and contents, and the anhydrous sulphurous oxide is then released from the pressure to which it has been subjected and allowed to expand in the said tank or chamber in the presence of the meat. This expansion naturally causes cooling or refrigeration in the meats. If carbonic-acid gas is to be used, it is then admitted to the chamber in the proportion of about one of $CO_2$ to three of $SO_2$. These gases are allowed to remain in the presence of the meats from one-half hour to ten hours, more or less, according to the meats to be preserved and other natural conditions affecting the process. The tank may be then opened and the meats exposed to the atmosphere.

It is to be understood that the carbonic acid may or may not be used, though its presence in the process is desirable. The anhydrous sulphurous-oxide gas is reduced to a liquid or solid condition by pressure and cold, and is sealed under pressure of about forty-five pounds, and the storage tank or vessel containing said gas may be placed either inside or outside the treating tank or chamber being so connected that the gas can be admitted directly therein, it becoming volatilized upon removal of the pressure—say by opening a cock or valve.

While it is most desirable to refrigerate the meat before treating it with the anhydrous sulphurous oxide, yet it is evident that that step may possibly be dispensed with under some conditions, as the expansion of the anhydrous sulphurous oxide in a vacuum creates sufficient refrigeration for the purpose in most instances.

While I have described some minute details in the process of the preservation, pickling, and curing of hams, it is to be understood that I do not limit myself to the said steps, as the essential feature of my invention is the treatment of refrigerated meats with anhydrous sulphurous-oxide gas, and then the drying of the hams after they have been in pickle.

Animal matter thus preserved will resist decomposition and putrefaction for an indefinite period, and meats preserved in the condition above indicated remain in such a natural state that if pricked many months after treatment the blood will follow, indicating a freshness equal to newly-slaughtered beef.

Having now described my invention, what I claim as new, and desire to secure by Letters Patent, is—

1. The process for preserving animal matters which consists in first extracting the animal heat, then causing a vacuum, and thus removing the air and moisture therefrom, and then impregnating the animal matter with anhydrous sulphurous-oxide gas, substantially as and for the purpose specified.

2. The process for preserving animal matters—such as hams—which consists in first extracting the animal heat, air, and moisture therefrom, then subjecting the exhausted hams to the action of anhydrous sulphurous-oxide gas, and then treating said hams to the pickle bath, substantially as and for the purposes specified.

3. The process for preserving animal matters—such as hams—which consists in first extracting the animal heat, air, and moisture therefrom, then subjecting the exhausted meats to the action of anhydrous sulphurous-oxide gas, then treating the said meats to the pickle, then again extracting the air and moisture from the pickled hams, and, finally, subjecting the hams in that condition to the smoking process, substantially as and for the purpose specified.

4. In the process of preserving foods, the treatment consisting of impregnation by sulphurous anhydride followed by impregnation with smoke.

5. In the process of preserving foods, the treatment consisting of impregnation by sulphurous anhydride followed by impregnation with smoke under pressure, as specified.

GEORGE HOLGATE.

Witnesses:
J. M. COLLINGWORTH,
GEO. H. MILLETT.